INVENTOR
A. ASHKIN
BY Wilford L. Wisner
ATTORNEY

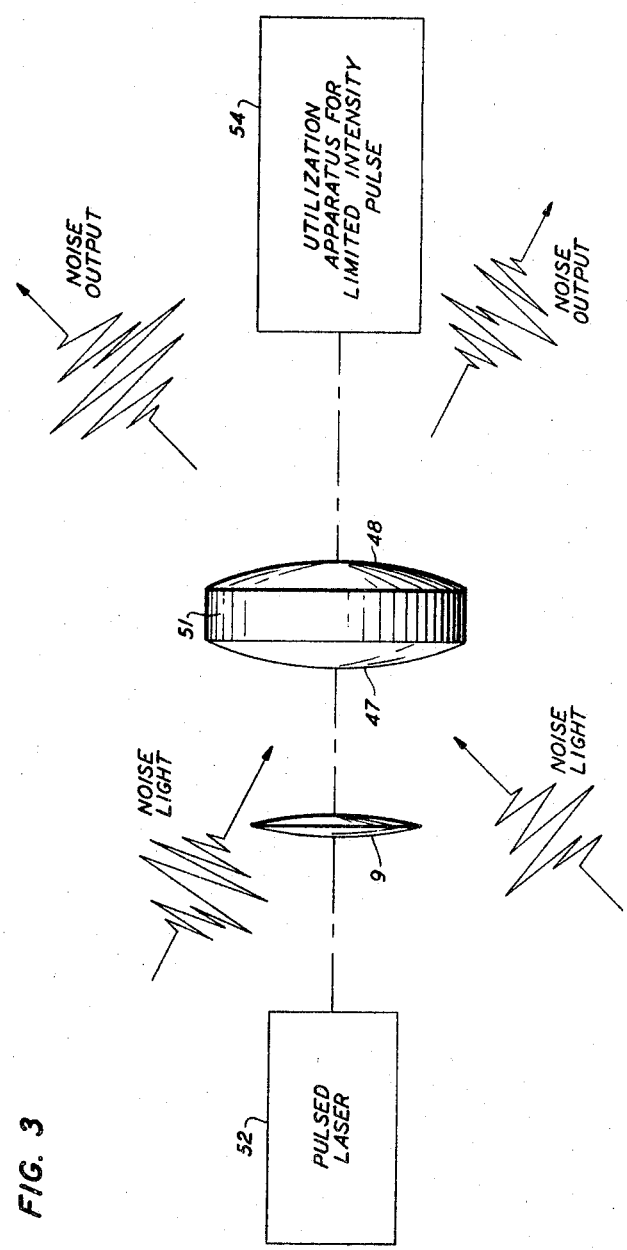

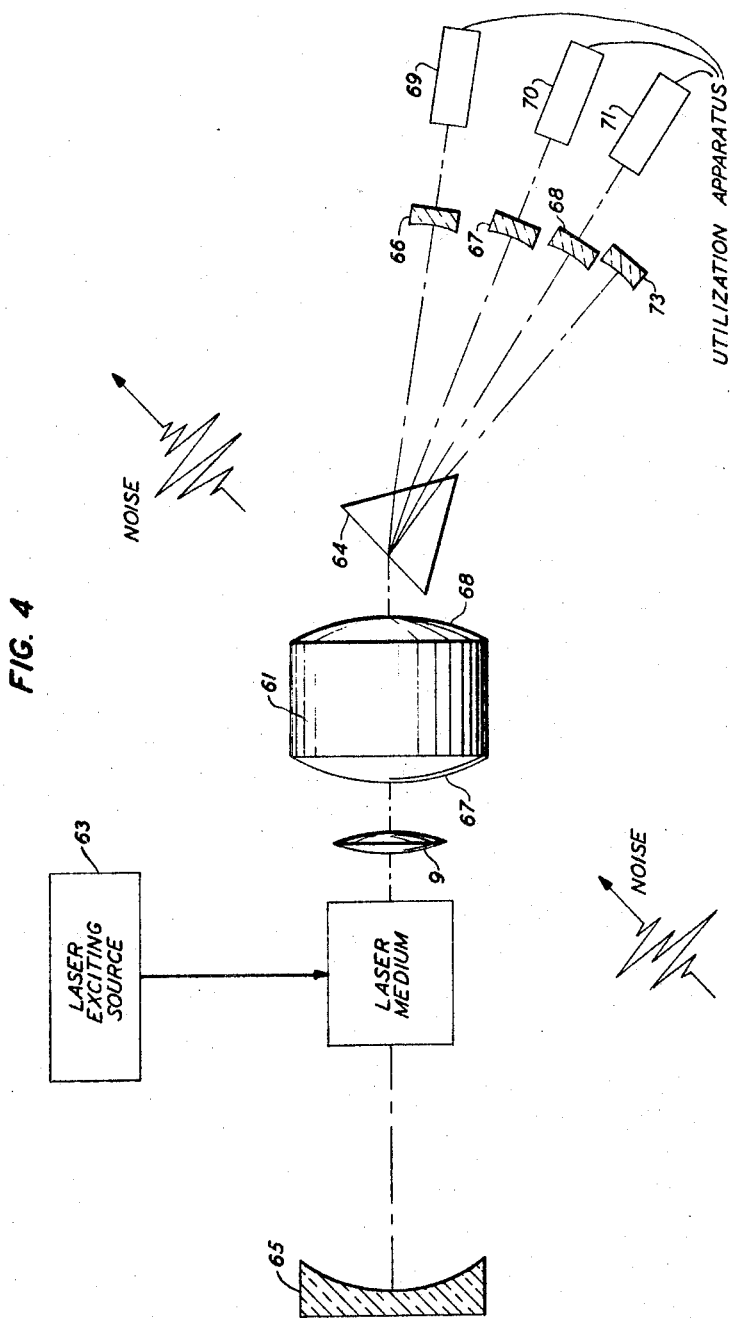

United States Patent Office 3,267,385
Patented August 16, 1966

3,267,385
OPTICAL PARAMETRIC AMPLIFIER, OSCILLATOR, AND LIMITER USING NON-PHASE MATCHABLE INTERACTION
Arthur Ashkin, Bernardsville, N.J., assignor to Bell Telephone Laboratories, Incorporated, New York, N.Y., a corporation of New York
Filed Aug. 19, 1965, Ser. No. 480,986
11 Claims. (Cl. 330—4.6)

This invention relates to the generation and amplification of electromagnetic waves having wavelengths comparable to or shorter than the dimensions of the amplifying device.

It will be convenient hereinafter to discuss the invention with particular reference to light waves and waves of shorter wavelength; but it is to be understood that the principles are similarly applicable to longer wavelengths, such as wavelengths in the microwave range.

The recently developed optical parametric amplifiers have complemented the more highly publicized laser amplifiers by providing amplification bandwidths that are many times broader than laser bandwidths. In some proposed optical communication systems, particularly multiple channel systems, it is desirable to provide broadband amplifiers for repeating the signal-modulated beam.

An optical parametric amplifier typically comprises a material that has a nonlinear, i.e., amplitude-dependent, response to each incident light wave. In addition to an information-modulated wave to be amplified, a so-called pumping wave of another frequency is applied to the material in such a way as to interact with and transfer energy to the information-modulated wave. The amplification of the information-modulated wave, as produced by this transfer of energy, is called parametric gain.

It has been heretofore recognized that traveling wave interactions are advantageous for efficient parametric devices. A traveling wave interaction occurs when the transfer of energy from the pumping wave to the information-modulated wave can be maintained over as large a volume of the nonlinear medium as the two waves can traverse in common, regardless of the number of wavelengths of each wave that are involved. Such traveling wave interactions are to be contrasted with interactions providing transfer of energy in the desired sense only over a restricted length and providing transfer of energy in the reverse sense between the waves for any further common propagation of the waves. The main line of development, both of optical second harmonic generators and of optical parametric amplifiers, has centered around the use of birefringent materials to obtain phase-matching, which enables traveling wave parametric amplification. Phase matching is the process of making the sum of the signal and idler phase vectors equal to the pumping phase vector. A phase vector is related to the product of index of refraction and frequency, or to index divided by wavelength. Birefringence has been thought to be necessary for phase matching, because the indices of refraction of nearly all materials vary with frequency.

The apparent limitation of optical traveling wave parametric amplifiers to optically birefringent materials has had the unfortunate effect that such highly nonlinear light-transmitting materials as gallium arsenide (GaAs) have been neglected in the earch for better parametric amplifiers because they are not birefringent. Moreover, other nonlinear materials that are birefringent, such as lithium niobate ($LiNbO_3$), have some very strong nonlinearities that are commonly called non-phase-matchable, i.e., for which the phase relationships have been considered to be inappropriate for traveling wave interactions. For example, all of the waves coupled through such a nonlinearity may have the same polarization, so that the birefringence cannot be used for phase matching. Such interactions in either type of material will be referred to hereinafter as non-phase-matchable, for the sake of brevity. Of course, other weaker nonlinearities in a birefringent material may be phase-matchable; lithium niobate has both types of nonlinearities.

While it has been recognized heretofore that small deviations from a desired phase-matching condition can be compensated if phase-matching is inherently possible, it has not been considered possible to compensate the substantial irreducible phase mismatch occurring in nonlinear interactions when the medium is not birefringent or when the polarization of the interacting waves are alike.

An object of my invention is traveling wave parametric amplification through nonlinear optical interactions that are non-phase-matchable.

My invention resides in my recognition that substantial and irreducible vector phase mismatches in the nonlinear coupling of optical signal and pumping waves can be compensated by providing a sufficiently high pumping power level in relation to other relevant parameters.

Further, my invention resides in my recognition that laser emissions can be produced with sufficient power and spectral purity to provide such a pumping beam.

An advantage of my invention is that parametric gain in materials such as gallium arsenide and lithium niobate can greatly exceed that achieved heretofore in parametric interactions.

A separate feature of my invention resides in the employment of curved focusing surfaces upon the nonlinear optical medium in order to reduce the pumping beam radius therein, thereby reducing the required pumping power.

A more complete understanding of my invention will be obtained from the following detailed description in conjunction with the drawing, in which:

FIG. 3 is a partially block diagrammatic and partially pictorial showing of an optical power limiter according to the invention; and FIG. 4 is a partially block diagrammatic and partially pictorial showing of a multiple frequency oscillator according to the invention.

Figure 1:
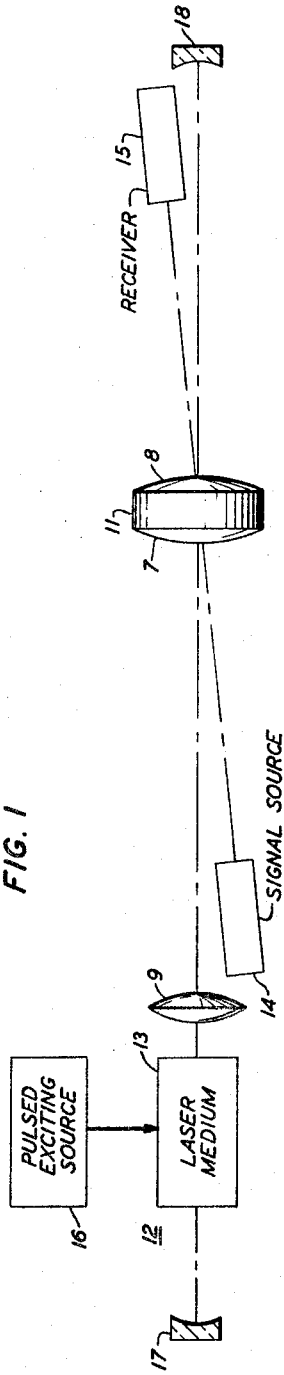
FIG. 1 is a partially block diagrammatic and partially pictorial showing of a single channel parametric amplifier according to the invention.

In order to understand the invention more fully, it is desirable first to understand the nature of second harmonic generation and optical parametric amplification.

In second harmonic generation the driving, or fundamental, beam induces an electric polarization wave in the material, i.e., essentially a wave-like motion of electric dipoles in the material. In a noncentrosymmetric, i.e., piezoelectric, material the electric polarization is not proportional to the electric field strength of the driving wave;

and, indeed, it has a significant component that is proportional to the square of the electric field strength of the driving wave. This component of the electric polarization is not sensitive to the polarity of the electric field intensity of the driving wave and varies at twice the frequency of the driving wave. The moving charges radiate energy at twice the frequency of the driving wave.

It is characteristic of second harmonic generation that the phase of the induced electric polarization wave is locked to the phase of the driving wave, which is the only applied wave. Unless phase matching conditions are satisfied for the driving wave and the radiated second harmonic wave, for example, as taught in the copending application of J. A. Giordmaine et al. Serial No. 158,267, filed December 11, 1961, now Patent No. 3,234,475 the second harmonic waves radiated from various points within the crystal do not interfere constructively outside of the material. That is, no effective traveling wave generation of the second harmonic is obtained. Variation of the driving power does not affect the relative phases of fundamental and harmonic waves when phase-matching conditions are not satisfied.

On the other hand, in parametric amplification, at least two applied beams of different frequencies, the pumping beam and the modulated signal beam, are involved in producing the electric polarization wave. It has been shown by P. K. Tien in the article "Parametric Amplification and Frequency Mixing in Propagating Circuits," Journal of Applied Physics, 29:1347 (1958) and by J. A. Armstrong et al. in the article "Interactions Between Light Waves in a Nonlinear Dielectric," Physical Review 127:1918 (1962) that increased pumping power can overcome the effects of small amounts of phase mismatch, such as occur inadvertently because of minor misalignments of the light beams or other imperfections in a parametric amplifier in which provisions for phase-matching have been made.

I have recognized that this basic technique of compensating for phase mismatch is not limited to nonlinear interactions heretofore recognized as phase-matchable and can be applied where the amount of phase mismatch is substantial, that is, orders of magnitude larger than contemplated in the foregoing references. In certain crystals having large nonlinearities, it is only necessary to supply a sufficiently large pumping power in relation to the other relevant parameters as described hereinafter. Such large pumping power is possible with recently developed lasers, such as will be more fully specified hereinafter.

These lasers are sufficiently powerful to provide traveling wave parametric gain through the highly nonlinear non-phase-matchable interactions in suitable materials with the simple adaptation of introducing the nonlinear material within the optical resonator of the laser. Moreover, some of the recently developed pulsed lasers can provide sufficient power in a single mode that the crystal can be disposed outside the resonant cavity.

It can be shown that the pumping power threshold for traveling wave parametric amplification with a substantial vector phase mismatch $\overrightarrow{\Delta\beta}$ is given by the relationship. Threshold $$P_p = \frac{cn_p n_s n_i}{(16\pi)^4} \left[ \frac{\omega_p^2 R_o \lambda_p |\overrightarrow{\Delta\beta}|}{\omega_s \omega_i D} \right]^2 \quad (1)$$

ergs per second
where $\omega_s$ is the angular frequency of the signal beam, $\omega_p$ is the angular frequency of the pumping beam, $\omega_i$ is the angular frequency of the idler beam, $\lambda_p$ is the wavelength of the pumping beam in cm., $R_o$ is the radius of the pumping beam in cm., $c$ is the velocity of light in cm./sec., $n_p$ is the index of refraction of the material for the pumping wave, $n_s$ is the index of refraction of the material for the signal wave, $n_i$ is the index of refraction of the material for the idler wave, and $D$ in esu. is the nonlinear second order polarization coefficient. $\Delta\beta$ has the units cm.$^{-1}$. This threshold is the power required to overcome the losses produced by vector phase mismatches and is much greater than the conventional threshold for prior art parametric processes. The latter threshold consists only of the power required to overcome absorption, reflection and defraction losses in the nonlinear crystal, which are usually negligible compared to the losses due to vector phase mismatches.

A single channel parametric amplifier according to the invention is shown in FIG. 1. The amplifier comprises a crystal 11 of gallium arsenide, which is a noncentrosymmetric optically isotropic crystal having a large second order nonlinear coefficient, and having a thickness of about one centimeter in the direction of the laser axis. A high power pulsed uranium-doped calcium fluoride laser 12, comprising the laser medium 13, the exciting source 16 and the reflectors 17 and 18, supplies a pumping beam directed at the crystal 11 through a focusing lens 9. The crystal 11 is provided with convex focusing surfaces 7 and 8 by conventional polishing techniques in order to provide the beam with a radius approximately equal to seven wavelengths of the pumping beam within the crystal 11. A signal source 14 supplies a modulated series of pulses of radiation in the wavelength range between 3.25μ and 13μ. These pulses are synchronized with the pulsed exciting source 16 so that a series of signal pulses are applied to the nonlinear medium 11 at the same time as it is being supplied with pulses from the laser 12. Source 14 directs the signal beam upon crystal 11 at a small angle, illustratively six degrees (6°), and with respect to the beam from laser 12. A receiver 15 is positioned to receive the amplified signal beam from crystal 11.

Source 14 may be a transmitter. In the event that it is remote from laser 12, so that laser 12 and crystal 11 comprise a repeater, exciting source 16 may be synchronized by appropriate control pulses received from signal source 14. Likewise, receiver 15 may be remote from laser 12 and crystal 11. Together, the assembly of laser 12 and crystal 11 forms a communication repeater of the PCM type. With the signal source and receiver, the entire assembly forms a communication system.

Pulsed laser 12, including active medium 13, near confocal reflectors 17 and 18 and the pulsed exciting source 16 is illustratively of the type disclosed in the article "Excitation, Relaxation and Continuous Maser Action in the 2.613-Micron Transition of Ca F$_2$: U$^{3+}$," by G. D. Boyd et al., Physical Review Letters, Vol. 8, p. 269 (1962). The power level of the laser beam within the resonator is directly dependent upon the power level of the exciting beam from source 16, which illustratively is a mercury flash lamp. To obtain the desired power level, the laser source 16 is operated on a pulsed basis.

It should be understood that reflectors 17 and 18 form the resonator for the laser beam, although the exciting can also utilize focusing apparatus as disclosed in connection with FIG. 3 of the above-cited article.

Communication signal source 14 illustratively comprises a helium-xenon laser operating upon an emission line at 5.5738μ together with an electro-optic shutter of known type adapted to modulate the laser beam in accordance with signal information on a pulsed basis. The helium-xenon laser, for example, is of the type disclosed in the copending application of W. R. Bennett, Jr., et al., Serial No. 237,271, filed November 13, 1962 and assigned to the assignee hereof, and the electro-optic shutter illustratively comprises a nitrobenzene Kerr cell modulator disposed between crossed polarizers.

Communication receiver 15 is illustratively a photo-detector of known type.

Gallium arsenide crystal 11 is oriented at an angle, with respect to the incident pumping beam, which produces a nonlinear interaction effectively utilizing its large second-order polarization coefficient. Illustratively, the pumping radiation is incident perpendicular to one crystalline axis and at an oblique angle, i.e., 45°, to the other two crystalline axes and is polarized perpendicular or parallel to the one axis. The polarization of the signal radiation is not critical, so long as both the pumping and signal radiations are not polarized parallel to the same crystalline axis; in other words, the pumping and signal radiations should have components that are polarized parallel, respectively, to mutually orthogonal crystalline axes. Inasmuch as crystal 11 is isotropic, the vector phase mismatch $\vec{\Delta\beta}$, is independent of the orientation of the crystal. Further $\vec{\Delta\beta}$ depends only upon the angle between the pumping and signal beams, as would be expected from trigonometric considerations, since phase vectors are involved.

While the embodiment of FIG. 1 involves pulsed amplification of the signal, it is understood that continuous-wave amplification could be achieved with a suitable continuous-wave laser and a continuous-wave signal. For example, for continuous-wave operation the laser could be of the type disclosed in connection with FIG. 4 hereinafter.

In the typical operation of the embodiment of FIG. 1, laser 12 delivers to crystal 11 about 2960 watts of pulsed pumping power with a free space wavelength of 2.6$\mu$ and a beam radius of $$\frac{7 \times 2.6}{3.31} \mu$$

or 5.50$\mu$ within crystal 11, where 3.31 is the index of refraction of GaAs. It should be particularly noted that the curved focusing surfaces 7 and 8 of crystal 11 itself make feasible this relatively small beam radius of the pumping beam where it interacts with the signal beam. It is not easy to achieve the same effect with external focusing alone, i.e., by means of lens 9, because of diffraction limitations. Specifically, it is extremely difficult to focus radiation to a beam radius between one and two wavelength with lens 9, because of diffraction limitations. It is noted that the wavelength of the pumping radiation within crystal 11 is $$\frac{2.6}{3.31}\mu$$

or 0.785$\mu$, so that it is easier to focus it within crystal 11 to obtain the desired beam diameter than to focus it to that diameter outside crystal 11 and then introduce it into the crystal. For collinear pumping and signal beams, a signal free space wavelength of 5$\mu$, and a vector phase mismatch, $\vec{\Delta\beta}$, of $$\frac{0.150}{\lambda_p}$$

the pumping power threshold for traveling wave interaction in accordance with the invention is ideally about 740 watts, as calculated from Equation 1 above. For the given 6° angle between the pumping and signal beam, $\vec{\Delta\beta}$ increases by a factor of about 1.8.

The interaction of pumping and signal beams in crystal 11 will generate an idler wave of a frequency equal to the difference between pumping and signal frequencies. Power will be transferred from the pumping beam to the signal and idler beams in a traveling wave interaction.

We can now calculate the total gain for one traverse through the crystal 11. It is noted that, although crystal 11 is one centimeter thick to provide for focusing, the effective interaction length $l_d$ is approximately the near-field distance, 100 $\lambda_p$ in this case. For the example being discussed, the effective interaction length, $l_d$=0.24 millimeter, approximately. The gain is calculated from the relationships;

$$\text{Gain} = e^{\alpha l_d}$$

where $e$ is the base of the natural logarithms, $l_d$ is the interaction distance, and $$\alpha = \frac{1}{2}\left(\frac{\text{Applied } P_p \cdot (16\pi)^4}{cn_p n_s n_i}\left[\frac{\omega_s \omega_i D}{\omega_p^2 R_o \lambda_p}\right]^2 - |\vec{\Delta\beta}|^2\right)^{1/2} \quad (2)$$

where applied $P_p$ is the pumping power applied to crystal 11 by laser 12 and the other terms have been defined in connection with Equation 1 above. It will be seen that the gain increases exponentially with the interaction distance. Gain of this type is commonly described as exponential parametric gain.

From the parameters given and the dispersion curve of GaAs, for the case of collinear pumping and signal beams, $$|\vec{\Delta\beta}| = \frac{0.150}{\lambda_p}$$

Applied $P_p$=2960 watts and $l_d$=100$\lambda_p$, $\alpha l_d \doteq 11.8$.

The total exponential parametric power gain for the collinear radiations is $e^{11.8} = 10^{5.0}$ or 50 db.

For the six degree angle between the pumping and signal beams in the illustrative embodiment of FIG. 1, $|\vec{\Delta\beta}|$ increases by a factor of 1.8, $l_d$ becomes slightly less than 100$\lambda_p$, and the total exponential power gain is approximately 25 db. It should be noted that with moderately increased pumping power, similar performance can be achieved for larger angles between pumping and signal beams.

A further condition for achieving this gain is that the input signal beam be sufficiently low in power level that the pump power is not substantially depleted in providing the amplified output signal beams. At the specified gain level, this relationship is readily provided in a communication system.

Obviously, this process can be repeated every few miles by repeaters comprising components like laser 12, and crystal 11, with the repeated signal beam traversing the crystal at a small angle with respect to the laser pumping beam as shown.

In the foregoing considerations, it was assumed that only parametric processes were taking place. In the presence of the large pumping power at 2.6$\mu$, second harmonic generation at 1.3$\mu$ will be a competing process. Nevertheless, this effect will be quite weak. No traveling wave build-up of second harmonic occurs. It can be shown that the pumping power converted to second harmonic in a coherence length is less than seven percent of the pumping power at 2.6$\mu$.

Moreover, the intensity of this harmonic power varies in an oscillatory fashion along the length of the crystal 11 and the actual second harmonic power loss in crystal 11 can be made very small by a slight refinement of the length of the propagation path for the pumping beam to terminate the interaction at a point where the second harmonic intensity is very small. The traveling wave amplifying properties of crystal 11 for the signal beam would not be substantially altered by this refinement.

Inherent in the operation of the apparatus of FIG. 1 at high traveling wave gain levels is a broad bandwidth. Over the range of signal wavelengths from 3.25$\mu$ to 13$\mu$, the gain constant $\alpha$ varies by no more than a factor of two. Actually $|\vec{\Delta\beta}|$ decreases as the signal and idler depart from the degenerate frequency of 5.2$\mu$; and thus the bandwidth is even larger than just indicated. It is important to note that this is true bandwidth, as opposed to the range of tunability, which is usually large in parametric amplifiers, if mechanical adjustments are utilized.

Moreover, operation at high gain levels permits considerable tolerance in the angle between the pumping beam and signal beam. Ordinarily, the more nearly collinear the pumping beam and the signal beam, the higher the gain. The variation is such that the six degree angle specified hereinbefore is a reasonable compromise between maximizing the efficiency and avoiding the complexity of the optics that would be needed if the pumping and signal beams were to be made collinear. Moreover, angles greater than six degrees are feasible if higher pumping power is available. I consider angles up to ten degrees to be presently feasible in view of available laser powers and interaction length considerations; and, as more powerful lasers become available, I consider this limiting angle to increase. Various modifications of the embodiment of FIG. 1 are possible.

Figure 2:
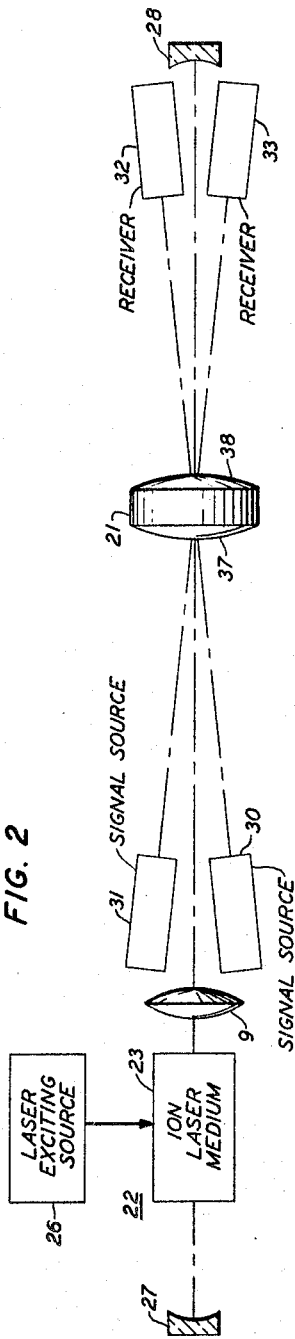
FIG. 2 is a partially block diagrammatic and partially pictorial showing of a multiple channel parametric amplifier according to the invention.

The modified embodiment shown in FIG. 2, which is illustratively a multiple channel communication system, is significant in that the non-phased-matched parametric amplification is achieved by pumping a birefringent nonlinear medium in a non-phase-matchable direction, i.e., so that the signal and pumping beams must have the same polarization in order to interact.

The crystal 21 is a noncentrosymmetric birefringent crystal of lithium niobate ($LiN_bO_3$) oriented to have its optic axis perpendicular to the axis of an argon-ion laser 22, which is the pumping source, and to have its curved focusing surfaces 37 and 38 intercepting the laser axis. The laser comprises a tube 23 containing the argon active gas and having a pumping or excitation source 26 and near confocal reflectors 27 and 28, the crystal 21 being disposed between tube 23 and reflector 28. The reflectors 27 and 28 are adapted for and tuned to the $0.51\mu$ argon-ion laser radiation. Signal sources 30 and 31 are disposed to project their signal beams upon crystal 21 through focusing surfaces 37 and 38 at small angles less than 10 degrees with respect to the laser axis but sufficient to avoid the laser apparatus; and receivers 32 and 33 are disposed, preferably remote from crystal 21, to receive the corresponding amplified signal beams. It is noted that additional signal repeaters may intercept the amplified signal beam before receivers 32 and 33. In practice, the signal sources and receivers are disposed so that the signal beams are arranged in a three-dimensional manner around the pumping beam. As they will in general have different wavelengths, equalization of the gains for these signals is needed and can be achieved by making the angle between each of them and the pumping beam inversely related to the amount by which each departs from the so-called degenerate wavelengths, $\lambda_{so}=2\lambda_p=1.02\mu$. For example, a $1.02\mu$ signal beam would make a ten degree angle with the pumping beam; while beams or greater or smaller wavelengths, within practical limits, would make smaller angles with the pumping beam to equalize the gains for all signals.

The radiations from the laser 12 and signal sources 30 and 31 are illustratively polarized parallel to the optic axis of crystal 21.

Argon-ion laser 12 is illustratively of the kind disclosed in the copending application of E. I. Gordon et al., Serial No. 439,657, filed March 15, 1965 and assigned to the assignee hereof.

Crystal 21 is of the type disclosed in the copending application of A. A. Ballman et al., Serial No. 414,366, filed November 27, 1964 and assigned to the assignee hereof, with the modification that the curved focusing surfaces 37 and 38 are fashioned by conventional polishing techniques to provide the desired small pumping beam radius within crystal 21.

The operation of the system of FIG. 2 will be substantially the same as that of FIG. 1 for the following reasons. With the specified orientation of the lithium niobate crystal 21, the nonlinear interaction occurs by coupling between the pumping and signal beams through the so-called $D_{33}$ second order nonlinear coefficient. This nonlinear interaction is considered to be non-phase-matchable because the pumping and signal beams are polarized in the same direction in order to obtain the interaction and because the crystal has appreciable normal dispersion in its index of refraction.

This mode of operation is to be contrasted with that disclosed for lithium niobate in the above-cited copending application of A. A. Ballman et al. In that arrangement the lithium niobate crystal was oriented to utilize its birefringence to obtain phase matching.

The $D_{33}$ coefficient utilized in the arrangement of the present FIG. 2 is about ten times larger than the $D_{31}$ coefficient used in the arrangement of the above-cited Ballman application.

In operation, the pumping power threshold for collinear traveling wave exponential gain is of the order of 400 watts, inasmuch as the argon-ion laser 22 is readily capable of operating at $0.51\mu$ with sufficient spectral purity to provide a beam radius $R_o$ of approximately two wavelengths, $0.44\mu$, within the crystal 21. It is noted that crystal 21 has an index of refraction of about 2.3. It may be seen from Equation 1 that reduction of wavelength and beam radius has a marked effect in reducing the pumping power threshold. Moreover, continuous-wave operation of the embodiment of FIG. 2 is possible because such a laser is capable of circulating powers within the resonator several times 400 watts on a continuous-wave basis.

The broad bandwidth of such an amplifier enables the simultaneous amplification of a multiplicity of communication signals.

The principles of the present invention are not limited to parametric amplification.

For example, it should be apparent that, in the embodiments of FIGS. 1 and 2, if the signal beams are modulated, the idler beams are also modulated. Since power flows from the pumping beams to the idler beams as well as to the signal beams, the arrangements of FIGS. 1 and 2 can be amplifying frequency converters. It is merely necessary to displace the respective receivers so that they receive the idler beams, which have well-defined directions.

A second example of other uses is provided by the embodiment of FIG. 3, which limits the output power level of the beam which is nominally the pumping beam.

Crystal 51 is a crystal of gallium phosphide, oriented in the same manner as described above for gallium arsenide in order to utilize its larger nonlinear second order coefficient. The variable intensity light source 52 is a pulsed ruby laser of known type operating at $0.69\mu$ at a variable pulsed power level that is several times the threshold for gallium phosphide, as calculated from Equation 1 above. I.e., laser 52 supplies pulses of several tens of kilowatts intensity. Utilization apparatus 54 is disposed to receive and utilize the unconsumed portion of the pulse from source 52, the power of which will be equal to the threshold power.

No separate signal source is provided. However, background noise at some wavelengths longer than $0.69\mu$ will ordinarily be available; and, since the pumping power is so far in excess of the threshold, noise radiations having a variety of directions and frequencies will be amplified. The significance of this noise amplification is that at the high gain level provided, the noise will substantially completely consume the pumping power in excess of the threshold.

Thus, the $0.69\mu$ beam received as a pulse by utilization apparatus 34 will have a limited power level. In other words, the pulse is a flat-topped pulse. It should be understood that there are described in the art a variety of uses for such a limited-amplitude pulse. An example is the precise promotion and control of a photo synthesis process, or other chemical reactions.

The advantage of a limiter as shown in FIG. 3 is that a clean-cut limiting threshold is provided without resonant, or so-called high-Q cavities. The sharply defined threshold is a direct consequence of the traveling wave parametric amplification provided according to the principles of the invention.

As a point of interest, it should be noted that crystal 51 is substantially opaque to the 0.35µ second harmonic of the laser radiation; and there is no process strongly competing with the noise amplification. It will be noted that second harmonics can be handled in either of two ways, as shown in the various embodiments; first, the crystal can be transparent thereto and proportioned to generate very little thereof; second, the crystal can be substantially opaque thereto, the strong absorption inhibiting second harmonic generation. An intermediate condition is ordinarily undesirable because the power absorbed will heat the crystal excessively.

The ability to amplify noise, as demonstrated by the embodiment of FIG. 3 also makes apparatus according to the invention useful for producing oscillations.

A multiple frequency oscillator according to the invention is shown in FIG. 4.

Gallium arsenide crystal 61 is pumped by a neodynium-doped yttrium aluminum garnet laser 62 at 1.06µ, as determined by the opaque reflectors 65 and 73 and pumping source 63. The 1.06µ pumping power circulating between reflectors 65 and 73 through prism 64, lens 9 and curved focusing surfaces 67 and 68 of crystal 61 is preferably several kilowatts of continuous-wave power. In crystal 61, various noise frequencies compete for the gain; and those frequencies which are appropriately refracted by the dispersive glass prism 64 are predominantly amplified because of multiple reflections between mirror 65 and the partially transmissive mirrors 66–68.

Portions of these frequencies pass through the partially transmissive reflectors 66–68 to be utilized in utilization circuits 69–71. Utilization circuits 69–71 may be electro-optic modulators in which the polarizations of the respective beams are modulated by information signals to be received eventually by receivers of known type capable of analyzing modulated polarization. Amplified noise that is not appropriately refracted passes out of the system without interfering with the desired outputs.

In order to provide the appropriately large pumping power substantially exceeding the threshold calculated from Equation 1 above, neodynium laser 62 may illustratively be of the type disclosed in the copending application of J. E. Geusic et al., Serial No. 367,306 filed May 25, 1964.

Crystal 61 could be replaced by a gallium phosphide crystal, which is likewise noncentrosymmetric and isotropic but requires a greater pumping power than gallium arsenide. Gallium phosphide is relatively transparent to the 0.53µ second harmonic that is generated within the crystal 61 by the 1.06µ pumping beam.

In all cases it is understood that the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. A traveling wave parametric device comprising a body of a noncentrosymmetric material having a substantial nonlinear second order polarization coefficient that describes a non-phase-matchable interaction that couples incident waves to produce an idler wave, and means for providing traveling wave exponential parametric amplification for a signal beam, comprising means for applying said signal beam and a pumping beam to said material in directions to be coupled through said non-phase-matchable interaction, the angle between the directions of said signal and pumping beams being less than ten degrees.

2. A device according to claim 1 in which the material is an optically isotropic crystal.

3. A device according to claim 1 in which the material is a birefringent crystal having a nonlinear coefficient that describes an interaction that is not phase-matchable through birefringence and the applying means directs the pumping and signal beams to be coupled through said interaction.

4. A device according to claim 1 in which the material is a crystal for which the strongest possible nonlinear interaction per unit interaction length is the non-phase-matchable interaction.

5. A device according to claim 1 in which the material is a crystal selected from the group consisting of gallium arsenide, gallium phosphide and lithium niobate.

6. A traveling wave light amplifier comprising a body of light-transmitting noncentrosymmetric material capable of coupling pumping, signal and idler waves through a nonlinear interaction that is non-phase matchable, said interaction being designated by a second order nonlinear coefficient D in esu., said body having opposed curved focusing surfaces; means for applying a signal beam of angular frequency $\omega_s$ to said material; and means for providing traveling wave exponential parametric amplification for said signal beam by applying a pumping beam of angular frequency $\omega_p$ to said material in a direction that intercepts said curved focusing surfaces to couple energy to said signal beam and produce an idler wave of angular frequency $\omega_i$ through said nonlinear interaction with a substantial vector phase mismatch $\Delta\beta$ in cm.$^{-1}$, said pumping beam having a wavelength $\lambda_p$ in cm., a beam radius $R_o$ in cm., and a power level greater than $$\frac{cn_p n_s n_i}{(16\pi)^4}\left[\frac{\omega_p^2 R_o \lambda_p |\overrightarrow{\Delta\beta}|}{\omega_s \omega_i D}\right]^2 \text{ ergs per second}$$

where $c$ is the velocity of light in cm./sec., $n_p$ is the index of refraction of the material for the pumping beam, $n_s$ is the index of refraction of the material for the signal beam, and $n_i$ is the index of refraction of the material for the idler wave, the angle between the directions of said pumping and signal beams being less than ten degrees.

7. A traveling wave light amplifier according to claim 6 in which the material is a crystal of gallium arsenide oriented to have one crystalline axis orthogonal to the direction of the pumping beam and two other crystalline axes oblique to the direction of the pumping beam.

8. A traveling wave light amplifier according to claim 6 in which the material is a crystal of lithium niobate oriented to have its optic axis orthogonal to the direction of the pumping beam.

9. A traveling wave light amplifier according to claim 6 in which the pumping beam applying means is a laser having a resonator and the body of material is disposed within said resonator.

10. Parametric wave translation apparatus comprising a crystal of a nonlinear isotropic optical medium, means for passing a signal beam through said crystal, and means for providing traveling wave exponential parametric amplification for said signal beam, comprising a pulsed solid state laser adapted to provide a pumping beam with a power level, direction and radius appropriate for said traveling wave parametric amplification in said crystal, the angle between the directions of said signal beam and said pumping beam being less than ten degrees.

11. An optical multiple frequency oscillator comprising a crystal capable of a nonlinear optical interaction for which substantial vector phase mismatching is obtained for any direction of pumping and signal beams that will produce said interaction, said crystal having opposed curved focusing surfaces intercepting one such direction, means including a dispersive element and a plurality of partially transmissive reflectors disposed around said crystal and said dispersive element to form individual resonators for a corresponding plurality of noise frequencies, and means for providing traveling wave exponential parametric amplification of said plurality of noise frequencies through said nonlinear optical interaction, including means for directing a pumping radiation beam with appropriate power, radius and direction through said curved focusing surfaces.

References Cited by the Examiner

UNITED STATES PATENTS 3,200,342 10/1965 Kibler _____ 330—4.3

References Cited by the Applicant

Physical Review, vol. 127, 1962, article by J. A. Armstrong et al., page 1918.

Applied Optics, vol. 1, 1962, article by A. E. Siegman, page 739.

Journal of Applied Physics, vol. 29, 1958, article by P. K. Tien, page 1347.

ROY LAKE, *Primary Examiner.*

D. R. HOSTETTER, *Assistant Examiner.*